US009868205B2

United States Patent
Brogårdh et al.

(10) Patent No.: US 9,868,205 B2
(45) Date of Patent: Jan. 16, 2018

(54) COMPACT PARALLEL KINEMATICS ROBOT

(71) Applicant: ABB SCHWEIZ AG, Baden (CH)

(72) Inventors: Torgny Brogårdh, Västerås (SE); Johan Ernlund, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/122,226

(22) PCT Filed: Mar. 18, 2014

(86) PCT No.: PCT/EP2014/055356
§ 371 (c)(1),
(2) Date: Aug. 29, 2016

(87) PCT Pub. No.: WO2015/139730
PCT Pub. Date: Sep. 24, 2015

(65) Prior Publication Data
US 2016/0368136 A1   Dec. 22, 2016

(51) Int. Cl.
*B25J 9/00* (2006.01)
(52) U.S. Cl.
CPC .......... *B25J 9/0045* (2013.01); *B25J 9/0051* (2013.01)
(58) Field of Classification Search
CPC ...... B25J 9/0051; B25J 9/0045; B25J 9/0048; B25J 9/003
See application file for complete search history.

(56) References Cited

U.S. PATENT DOCUMENTS

| 6,339,969 | B1* | 1/2002 | Salcudean | B25J 9/106 74/490.01 |
| 7,188,544 | B2 | 3/2007 | Persson et al. | |
| 8,997,438 | B1* | 4/2015 | Fallas | B65G 47/914 414/222.01 |
| 9,636,821 | B2* | 5/2017 | Yazawa | B25J 9/0051 |
| 2006/0245894 | A1 | 11/2006 | Merz et al. | |
| 2008/0295637 | A1 | 12/2008 | Lessard et al. | |
| 2009/0019960 | A1* | 1/2009 | Nabat | B25J 17/0266 74/490.03 |
| 2013/0189063 | A1 | 7/2013 | Brogardh et al. | |

FOREIGN PATENT DOCUMENTS

WO   03066289 A1   8/2003
WO   2012031635 A1   3/2012

OTHER PUBLICATIONS

International Search Report and Written Opinion of the International Searching Authority Application No. PCT/EP2014.055356 dated Nov. 27, 2014;Completed: Oct. 21, 2014 9 pages.

* cited by examiner

*Primary Examiner* — William Kelleher
*Assistant Examiner* — Gregory T Prather
(74) *Attorney, Agent, or Firm* — Whitmyer IP Group LLC

(57) ABSTRACT

A parallel kinematics robot has a first drive arm and a second drive arm, the two drive arms being crossed when the robot operates within its normal work area. The drive arms thereby occupy less space in a horizontal direction compared with a situation where the two drive arms point away from each other.

10 Claims, 2 Drawing Sheets

COMPACT PARALLEL KINEMATICS ROBOT

TECHNICAL FIELD

The present invention relates to a parallel kinematics robot that is compact in that its drive arms do not extend over a great width.

BACKGROUND

Conventional parallel kinematics robots comprise a plurality of drive arms each connected, directly or via a gearbox, to a respective shaft of a servo motor at one end. At the opposite end the drive arms are attached to proximate ends of rods via ball joints having three degrees of freedom (DOF). The rods transmit the rotating movement of the drive arms to a respective movement of an end effector that is attached to distal ends of the rods via ball joints. The servo motors and the respective drive arms are thereby working in parallel in the sense that manipulation of one drive arm does not affect the position of the remaining drive arms.

A delta robot is one well known type of parallel kinematics robot that can comprise three drive arms. Each drive arm is connected to an end effector with two rods having a ball joint at each end. The drive arms rotate about respective servo motor axes, the servo motors being arranged symmetrically such that their axes intersect at 60 degrees angles. Because the drive arms of a delta robot are relatively long and point in different directions the robot construction needs a lot of space. U.S. Pat. No. 7,188,544 discloses one type of a delta robot comprising three drive arms. Delta robots can also comprise four or more drive arms.

WO200366289 discloses other and less well known types of parallel kinematics robots comprising three or more drive arms. The robots according to WO200366289 differ from delta robots in that the rotational axes of the drive arms are parallel, and in many embodiments the drive arms even have one common rotational axis. The number of rods between the drive arms and the end effector vary from one to three depending on a drive arm and a robot embodiment. Also the drive arms of the robots according to WO200366289 need to be relatively long and well spread, and consequently need a lot of space.

There remains a desire to provide a more compact parallel kinematics robot.

SUMMARY

One object of the invention is to provide a compact parallel kinematics robot.

These objects are achieved by the device according to the different features of the present invention.

The invention is based on the realization that the drive arms occupy less space in a horizontal direction when two of them are arranged to cross each other when the robot is operating within its normal work area.

According to a first aspect of the invention, there is provided a parallel kinematics robot comprising a first shaft rotatable about a first axis, a second shaft rotatable about a second axis, and a third shaft rotatable about a third axis. The robot further comprises a first drive arm attached to the first shaft, a second drive arm attached to the second shaft, and a third drive arm attached to the third shaft, each drive arm being connected to an end effector by means of at least one rod. The first, second and third axes are parallel and a distance between the first axis and the second axis is at least 30% of the length of the first drive arm. The first and second axes define a reference plane, the end effector having an extreme position furthest away from the reference plane. A reference axis perpendicular to the reference plane extends between the reference plane and the extreme position. When the end effector is positioned at a middle point of the reference axis, the first and second drive arms are crossed.

According to one embodiment of the invention, the distance between the first axis and the second axis is at least 40%, such as 50%, 60%, 70% or 75%, of the length of the first drive arm.

According to one embodiment of the invention, the first and second shafts extend from respective actuators in a first direction, and the third shaft extends from a respective actuator in a second direction, the first direction being opposite to the second direction.

According to one embodiment of the invention, the reference plane is inclined in relation to a horizontal plane.

BRIEF DESCRIPTION OF THE DRAWINGS

The invention will be explained in greater detail with reference to the accompanying drawings, wherein.

DETAILED DESCRIPTION

Figure 1:
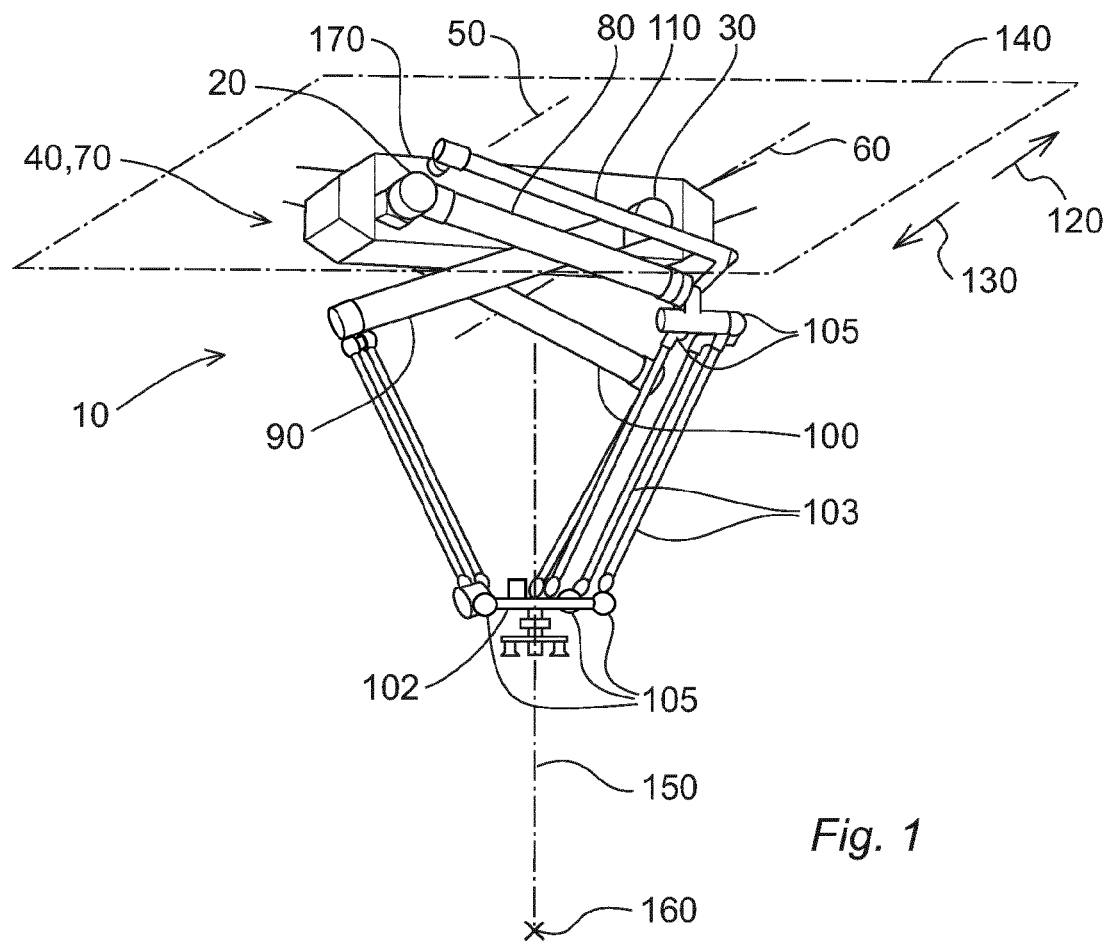
FIG. 1 shows a parallel kinematics robot according to one embodiment of the invention.

Referring to FIG. 1, a parallel kinematics robot 10 according to one embodiment of the invention comprises a first shaft 20 rotatable about a first axis 50, a second shaft 30 rotatable about a second axis 60, and a third shaft 40 rotatable about a third axis 70. A first drive arm 80 is attached to the first shaft 20, a second drive arm 90 is attached to the second shaft 30, and a third drive arm 100 is attached to the third shaft 40, each drive arm 80, 90, 100 rotating along with a respective shaft 20, 30, 40 about a respective axis 50, 60, 70. The first drive arm 80 is connected to an end effector 102 by means of three rods 103, the second drive arm 90 is connected to the end effector 102 by means of two rods 103, and the third drive arm 100 is connected to the end effector 102 by means of one rod 103. Each rod 103 is connected to the respective drive arm 80, 90, 100 and to the end effector 102 by means of joints 105 having three DOF. Parallel with the first drive arm 80 there is a parallel arm 110 the purpose of which is to keep the orientation of the end effector 102 constant.

The first and the second shafts 20, 30 extend in a first direction 120 from respective actuators, and the third shaft 40 extends in a second direction 130 from a respective actuator. All the axes 50, 60, 70 are thereby parallel. The actuators are servo motors including gears housed within a housing 170. When the robot 10 is in the position according to FIG. 1 the first and the second drive arms 80, 90 are crossed i.e. the longitudinal axis of the first drive arm 80 intersects the longitudinal axis of the second drive arm 90 observed from at least one direction. Indeed, the first and the second drive arms 80, 90 are crossed whenever the robot 10 is operating within its normal work area. For more precisely defining the present invention, a point belonging to the normal work area will now be defined.

For defining a point within the normal work area it is necessary to first define a reference plane 140 and a reference axis 150. The reference plane 140 is a plane defined by the first and second axes 50, 60 i.e. a plane which is parallel with both of these axes 50, 60. There exists an extreme position 160 which is a point at the periphery of the work area where the end effector 102 is furthest away from the reference plane 140. The reference axis 150 extends between the reference plane 140 and the extreme position 160, the reference axis 150 being perpendicular to the reference plane 140. A middle point of the reference axis 150 belongs to the normal work area of the robot 10, and according to the present invention the first and second drive arms 80, 90 shall be crossed when the end effector 102 is positioned at the middle point of the reference axis 150. The first shaft 20 is longer than the second shaft 30 in order to allow the first and the second drive arms 80, 90 to cross each other.

A distance between the first and second shafts 20, 30 is relatively long in order to draw advantage from the crossed drive arms 80, 90. Namely, when the first and second shafts 20, 30 are far from each other the respective first and second drive arms 80, 90 occupy in horizontal direction areas that largely overlap each other. The robot 10 can thereby be construed much more compact in the horizontal direction compared with a situation where the two drive arms 80, 90 point away from each other. According to the embodiment of FIG. 1 the distance between the first axis 50 and the second axis 60 is about 72% of the length of the first drive arm 80. For measuring the length of the first drive arm 80 a distance from the first axis 50 to a joint 105 attached to the first drive arm 80 and being furthest away from the first axis 50 shall be considered.

The robot 10 according to FIG. 1 is mounted such that the reference plane 140 is horizontal. However, the robot 10 can be mounted in any appropriate orientation for example in order to affect the shape of a useful work area.

Figure 2:
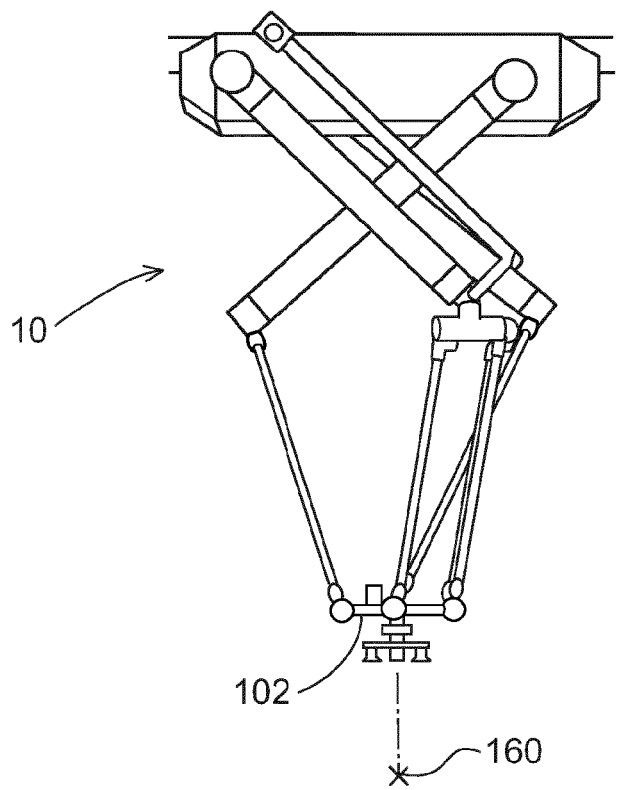
FIG. 2 shows the robot of FIG. 1 at a different position.

Referring to FIG. 2, the robot 10 of FIG. 1 is shown in a position where the end effector 102 is closer to the extreme position 160.

Figure 3:
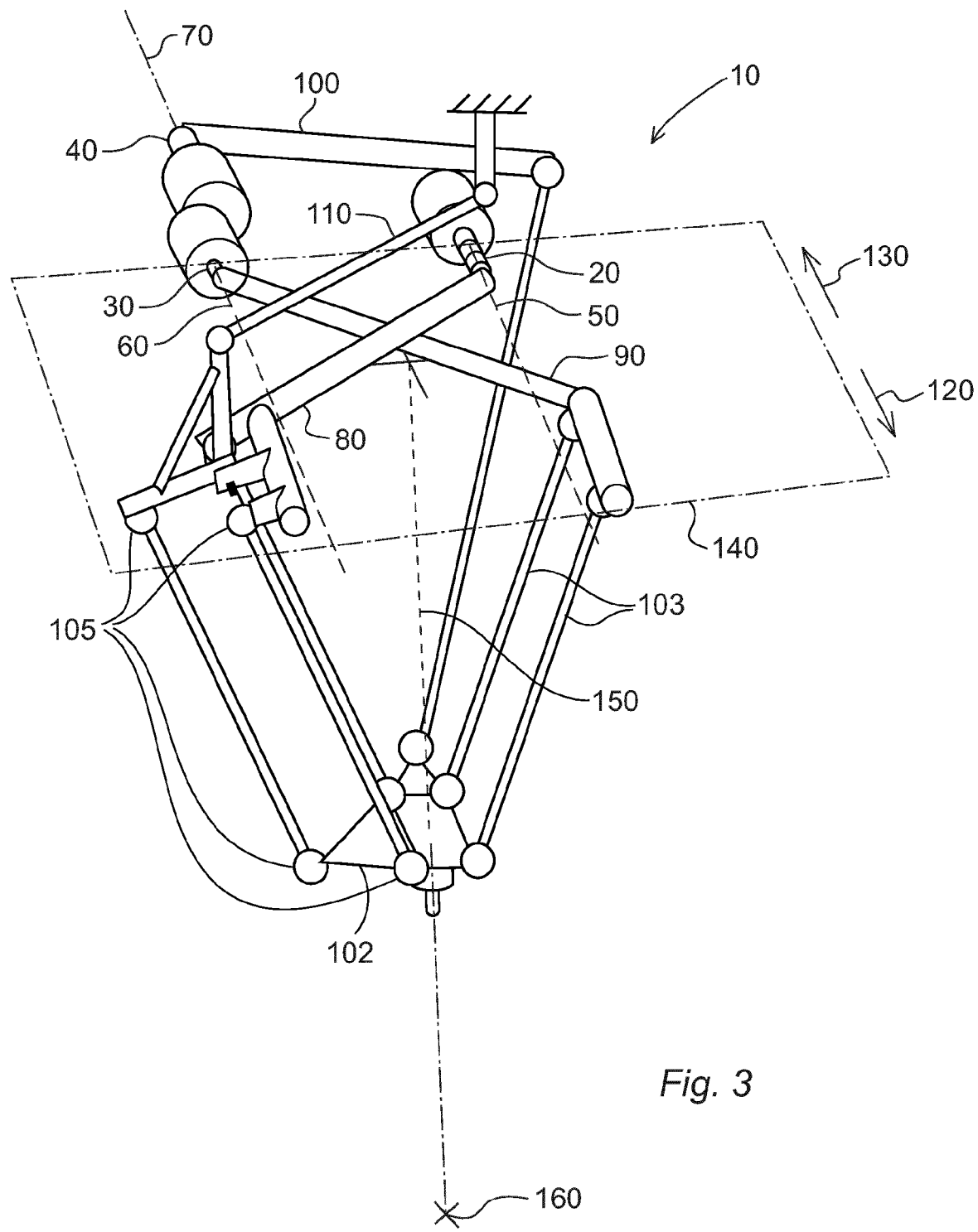
FIG. 3 shows a schematic view of a parallel kinematics robot according to one embodiment of the invention.

Referring to FIG. 3, a schematic drawing of a robot 10 according to the invention schematically shows the main elements of the robot 10.

The invention is not limited to the embodiments shown above, but the person skilled in the art may modify them in a plurality of ways within the scope of the invention as defined by the claims.

The invention claimed is:

1. A parallel kinematics robot, comprising:
a first shaft rotatable about a first axis, a second shaft rotatable about a second axis, a third shaft rotatable about a third axis;
a first drive arm attached to the first shaft, a second drive arm attached to the second shaft, a third drive arm attached to the third shaft, each drive arm being connected to an end effector by at least one rod;
the first, second, and third axes being parallel, and a distance between the first axis and the second axis being at least 30% of the length of the first drive arm;
the first and second axes defining a reference plane, the end effector having an extreme position furthest away from the reference plane;
a reference axis being perpendicular to the reference plane and extending between the reference plane and the extreme position;
wherein when the end effector is positioned at a middle point of the reference axis, the first and second drive arms are crossed when observed along a first direction, the first direction being a direction in which the first and second shafts extend from respective actuators.

2. The parallel kinematics robot according to claim 1, wherein the distance between the first axis and the second axis is at least 40% of the length of the first drive arm.

3. The parallel kinematics robot according to claim 2, wherein the distance between the first axis and the second axis is 50% of the length of the first drive arm.

4. The parallel kinematics robot according to claim 2, wherein the distance between the first axis and the second axis is 60% of the length of the first drive arm.

5. The parallel kinematics robot according to claim 2, wherein the distance between the first axis and the second axis is 70% of the length of the first drive arm.

6. The parallel kinematics robot according to claim 2, wherein the distance between the first axis and the second axis is 75% of the length of the first drive arm.

7. The parallel kinematics robot according claim 1, wherein the third shaft extends from a respective actuator in a second direction, the first direction being opposite to the second direction.

8. The parallel kinematics robot according to claim 1, wherein the reference plane is inclined in relation to a horizontal plane.

9. A parallel kinematics robot, comprising:
a first shaft rotatable about a first axis, a second shaft rotatable about a second axis, a third shaft rotatable about a third axis;
a first drive arm attached to the first shaft, a second drive arm attached to the second shaft, a third drive arm attached to the third shaft, each drive arm being connected to an end effector by at least one rod;
the first, second, and third axes being parallel, and a distance between the first axis and the second axis being at least 30% of the length of the first drive arm;
the first and second axes defining a reference plane, the end effector having an extreme position furthest away from the reference plane;
a reference axis being perpendicular to the reference plane and extending between the reference plane and the extreme position;
wherein when the end effector is positioned at a middle point of the reference axis, the first and second drive arms are crossed when observed along a direction parallel to the first, second, and third axes.

10. The parallel kinematics robot according claim 9, wherein the first and second shafts extend from respective actuators in a first direction parallel to the first, second, and third axes, and the third shaft extends from a respective actuator in a second direction parallel to the first, second, and third axes; and
wherein the first direction is opposite to the second direction.

* * * * *